Patented July 18, 1939

2,166,856

UNITED STATES PATENT OFFICE

2,166,856

POLYVINYL ACETAL RESINS AND COMPOSITION THEREOF

Kenneth Guy Blaikie and Robert Nelson Crozier, Shawinigan Falls, Quebec, Canada, assignors to Shawinigan Chemicals Limited, Montreal, Quebec, Canada No Drawing. Application August 13, 1937, Serial No. 159,016

8 Claims. (Cl. 260—73)

This invention relates to polyvinyl acetal resins having heat and exposure resistant properties.

It is well known that partially and completely hydrolyzed polyvinyl esters condense with aldehydes to produce polyvinyl acetal resins having a wide variety of properties.

Such resins are adapted to many different uses. They may be dissolved in solvents in the manufacture of lacquers, paints, coatings, adhesives and the like. In the solid state, they may be moulded or pressed into shaped bodies of various kinds and are thus taking a leading position in the plastics field.

On the other hand, a disadvantage from which polyvinyl acetal resins suffer is that they are unstable, particularly to prolonged heating at temperatures above 130° C. This is especially evident in the manufacture of moulded articles, where the resins are subjected to relatively high temperatures, as on steam-heated rolls during the incorporation of plasticizers, fillers, dyes, etc., and also during the actual moulding operations employing temperatures up to 150° C. the resins become discoloured, insoluble and otherwise deteriorated. Thus, to enlarge the field of their usefulness, these polyvinyl acetal resins must be rendered sufficiently stable to withstand such temperature conditions.

It is a main object, therefore, of the present invention to provide a polyvinyl acetal resin composition, practically stable to the conditions of heat and exposure encountered during its manufacture into commercial articles.

Another object of this invention is to provide a product of this nature which is readily produced from economically available materials.

With these and other objects in view the principal feature of the invention comprises the composition of polyvinyl acetal resins with a small quantity of a substance capable of rendering them stable. This stabilizing agent is added preferably before carrying out the hydrolysis of the polyvinyl ester, but such additions may be made during or after the hydrolysis reaction. In any case, this invention is not restricted to any particular means of incorporating the stabilizer into the resin.

In providing a stable polyvinyl acetal resin composition, the substances which we have found to be most useful as stabilizing agents are para-tertiary-amyl-phenol and/or certain derivatives thereof. Other substances which may be used are para-alkyl substituted phenols. Compositions embodying these substances are the first suitably stabilized resins of the polyvinyl acetal group.

Other stabilizers, quite effective in rubber, oils, and other materials, are either unstable to conditions of heat and light, are coloured, or impart colour to the resin. These characteristics render them unsuitable as stabilizing agents for polyvinyl acetal resins.

EXAMPLES

The following examples illustrate typical procedures according to the present invention. For convenient reference, the letters "P. T. A. P." have been used to indicate "para-tertiary-amyl-phenol."

Example I

Resin No. I.—10 gms. of polyvinyl acetate of viscosity 17.8 centipoises is dissolved in 30 gms. of 95% ethyl alcohol. Five cc. of paraldehyde and 2.21 cc. of concentrated hydrochloric acid are added and the temperature held at 40° C. for 100 hours with constant stirring. The resin is precipitated with water, thoroughly washed and dried below 100° C. in a stream of air.

Resin No. II.—The same procedure as for Example I, Resin No. I, except that 0.2 gm. of P. T. A. P. is incorporated into the reaction mixture before hydrolysis.

Samples of Resins No. I and No. II were heated in air at 145° C. for the following periods of time and with the following results:

| Time heated | Resin No. I | Resin No. II |
| --- | --- | --- |
| 0 | Colourless—fibrous | Colourless—fibrous. |
| 2 hrs | Slight colour—sintered | No change. |
| 4 hrs | Straw-coloured—fused | Practically no change. |
| 6 hrs | Yellow to brown-coloured—completely fused. | Faint yellow tinge—not completely fused. |

Resin II is exceptionally stable and shows practically no signs of deterioration or development of colour after four hours' heating in air at 145° C. Resin I, on the other hand, containing no stabilizer, commences to show colour after heating for two hours.

Example II 2000 gms. of polyvinyl acetate of viscosity 17.8 centipoises was dissolved in 5000 gms. of 95% methylated spirits. To this solution was added 1000 gms. of paraldehyde and 500 gms. of concentrated hydrochloric acid dissolved in 1000 gms. of 95% methylated spirits, after which the reaction was carried out at 40° C. for 53 hrs.

The resin was finally precipitated by water, thoroughly washed and dried in air below 100° C.

A weighed quantity of the resin was dissolved in alcohol to give a 15% solution. The stabilizing agent was mixed with the solution and the resin and stabilizer precipitated together, washed and dried in a stream of air. The following samples were prepared:

A. Resin with no added material.
B. Resin plus 0.5% P. T. A. P.

The resin, and resin plus added stabilizer were each heated in air for several hours at 145° C. with the following results:

|   | Time at 145°C. | Saponification value | Viscosity | Colour |
|---|---|---|---|---|
|   | *Hours* |   |   |   |
| A Blank, i. e. resin alone | 0 | 15.0 | 4.4 | Colourless. |
|   | 3 | 17.1 | 2.5 | Yellow. |
| B Resin plus P. T. A. P. | 3 | 15.4 | 3.5 | Practically colourless. |

The resin and resin plus stabilizer were each heated in air at 110° C. up to two days, as follows:

|   | Time at 110° C. | Saponification value | Viscosity | Colour |
|---|---|---|---|---|
| A | 0 | 15.0 | 4.4 | Colourless. |
|   | 1 day | 15.7 | 3.1 | Slight yellow. |
|   | 2 days | 18.0 | 2.1 | Yellow. |
| B | 0 | 15.0 | 4.4 | Colourless. |
|   | 1 day | 15.2 | 3.7 | Do. |
|   | 2 days | 15.8 | 3.2 | Do. |

Resin B is a markedly stable body. After two days' heating at 110° C. practically no change in colour takes place. The saponification value and the viscosity, which are direct indications of change within the resin, show that degradation has not proceeded to any great extent in resin B.

*Example III*

A polyvinyl acetal resin, prepared according to Example I, is treated with a stabilizer which is a condensation product of P. T. A. P. and formaldehyde, made according to any of the standard procedures for such bodies, and then added to the reaction mixture as set out in Example I. The following table clearly demonstrates the stability given to the resin by the presence of said substance when the resin is exposed to heat and air for three hours at a temperature of 150° C.

| Percent stabilizer content, condensation product of P. T. A. P. and formaldehyde | Relative viscosity | | Colour | |
|---|---|---|---|---|
|   | Before heating | After heating at 150° C. | Before heating | After heating at 150° C. |
| Nil | 4.1 | 2.7 | 1.2Y  0.3R | 25Y  4R |
| 0.10 | 4.1 | 3.6 |   |   |
| 0.25 | 4.1 | 4.05 | 1.3Y  0.5R | 2.2Y  0.7R |
| 0.50 | 4.1 | 4.04 |   |   |
| 1.0 | 4.1 | 4.14 |   |   |

The colours were obtained in a Lovibond tintometer on pressed discs of resin about ⅛" thick and 1" diameter. The resin containing no stabilizer when heated for three hours at 150° increased in colour value from 1.2 to 25 in the yellow, i. e., about 20 times, and from 0.3 to 4 in the red, i. e., about 13 times. The same resin containing 0.25% stabilizer when heated under the same conditions did not change appreciably in colour.

The preferred amount of stabilizer appears to lie between 0.20% and 0.3%. Less than 0.20%, as is seen from the table, allows some deterioration as shown by the drop in viscosity, while amounts greater than 0.30% show practically no further increase in stability.

In Example III the stabilizer is not restricted to the condensation product of P. T. A. P. and formaldehyde as a similar body using P. T. A. P. and acetaldehyde is equally suitable. Furthermore, in the preparation of the polyvinyl acetal resin the said stabilizer may be added before or after the hydrolysis reaction. It is also suitable to dissolve the resin in a solvent such as alcohol, then add the stabilizer, precipitate the resin and the stabilizer together, and wash and dry the precipitate.

*Example IV*

A solution containing 75 gms. of polyvinyl acetate, 132.3 cc. acetic acid, 47 cc. water and .375 gm. P. T. A. P. was reacted for four days at 40° C. with 10.1 cc. HCl and 66 cc. formalin solution, after which the resulting resin was precipitated, washed and dried. A sample of this resin after heating for 3 hours in air at 150° C. was only slightly tinged with a yellowish colour while the resin made from a similar reaction mixture in the absence of P. T. A. P. was undesirably brown in colour.

*Example V*

To a suspension of 12 grams of polyvinyl alcohol in 130 cc. of 95% ethyl alcohol was added 5 cc. of concentrated HCl, 12 cc. paraldehyde and 0.03 gm. of stabilizer in the form of a condensation product of P. T. A. P. and formaldehyde. The reaction was allowed to proceed for 100 hours at 40° C., after which the resultant acetal resin was precipitated, washed in water and dried in a stream of warm air below 100° C. The resin was then heated in air at 150° C. for three hours with only a slight development of colour, while the resin made by exactly the same procedure without the addition of the stabilizer turned a distinct red-brown colour when exposed to the same heat treatment.

Stable resins are also made according to the present invention, by condensing polyvinyl esters with aldehyde other than those described in the above examples, or with a mixture of two or more aldehydes either together or in succession, such as employed in the mixed resins described in the co-pending application Serial No. 700,608 filed December 1, 1933, issued May 10, 1938, as Patent No. 2,116,635. Furthermore, acetalization catalysts other than hydrochloric acid may be used, as for instance zinc chloride or calcium chloride. It has been found, however, that by using sulphuric acid as catalyst no pronounced improvement in the stability of the resultant resin is obtained.

It is understood that these examples employ temperature conditions and time factors which are considerably more extreme than the actual conditions which would influence the resinous products in commercial practice; likewise, it will be evident that the invention is not limited to the particular polyvinyl acetal resins or stabilizer concentrations employed.

In the present specification and claims "stable" means "the property of undergoing substantially no development of colour, under the conditions of heat and temperature to which the resinous product will ordinarily be subjected during its manufacture into commercial moulded articles". "Stabilizer" denotes an agent whose presence in the resinous product renders such product "stable".

Various modifications may be made in this invention without departing from its spirit or from the scope of the claims. Therefore, the exact forms demonstrated are to be taken as illustrative only and not in a limiting sense, and it is desired that only such limitations shall be placed thereon as may be imposed by the prior art or are set forth in the accompanying claims.

We claim:

1. A resinous composition comprising a polyvinyl acetal made by the condensation of a partially or completely hydrolyzed polyvinyl ester and an aldehyde, and a condensation product of para-tertiary-amyl phenol and an aldehyde.

2. A resinous composition comprising a polyvinyl acetal made by the condensation of a partially or completely hydrolyzed polyvinyl ester and an aldehyde, and a condensation product of para-tertiary-amyl phenol and formaldehyde.

3. A resinous composition comprising a polyvinyl acetal made by the condensation of a partially or completely hydrolyzed polyvinyl ester and an aldehyde, and a condensation product of para-tertiary-amyl phenol and acetaldehyde.

4. A resinous composition comprising a polyvinyl acetal made by the condensation of a partially or completely hydrolyzed polyvinyl ester and an aldehyde, and a condensation product of para-tertiary-amyl-phenol and an aliphatic aldehyde.

5. A resinous composition comprising a polyvinyl acetal made by the condensation of a partially or completely hydrolyzed polyvinyl ester and an aldehyde, and an amount of a condensation product of para-tertiary-amyl phenol and an aldehyde between about 0.20 per cent and 1.50 per cent of the composition.

6. A resinous composition comprising a polyvinyl acetal made by the condensation of a partially or completely hydrolyzed polyvinyl ester and an aldehyde, and an amount of a condensation product of para-tertiary-amyl phenol and an aliphatic aldehyde between about 0.20 per cent and 1.50 per cent of the composition.

7. A resinous composition comprising a polyvinyl acetal made by the condensation of a partially or completely hydrolyzed polyvinyl ester and an aldehyde, and an amount of a condensation product of para-tertiary-amyl phenol and formaldehyde between about 0.20 per cent and 1.50 per cent of the composition.

8. A resinous composition comprising a polyvinyl acetal made by the condensation of a partially or completely hydrolyzed polyvinyl ester and an aldehyde, and an amount of a condensation product of para-tertiary-amyl phenol and acetaldehyde between about 0.20 per cent and 1.50 per cent of the composition.

KENNETH GUY BLAIKIE.
ROBERT NELSON CROZIER.